United States Patent

Yoneda et al.

(10) Patent No.: US 6,706,906 B2
(45) Date of Patent: Mar. 16, 2004

(54) WATER REPELLENT COMPOSITION, SURFACE-TREATED SUBSTRATE, PROCESS FOR ITS PRODUCTION AND ARTICLE FOR TRANSPORT EQUIPMENT

(75) Inventors: Takashige Yoneda, Kanagawa (JP); Yutaka Furukawa, Kanagawa (JP); Noriko Torimoto, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 156 days.

(21) Appl. No.: 10/054,971

(22) Filed: Jan. 25, 2002

(65) Prior Publication Data

US 2002/0151645 A1 Oct. 17, 2002

(30) Foreign Application Priority Data

Feb. 1, 2001 (JP) ........................ 2001-025910

(51) Int. Cl.$^7$ ................................. C08K 3/00
(52) U.S. Cl. ................... 556/419; 556/410; 556/446; 556/448; 524/858
(58) Field of Search ................ 556/410, 419, 556/446, 448

(56) References Cited

U.S. PATENT DOCUMENTS

| 3,646,085 A | | 2/1972 | Bartlett et al. |
|---|---|---|---|
| 5,314,731 A | | 5/1994 | Yoneda et al. |
| 5,605,958 A | | 2/1997 | Yoneda et al. |
| 5,635,578 A | * | 6/1997 | Arai et al. ................ 528/15 |
| 5,663,399 A | | 9/1997 | Furukawa et al. |
| 5,834,612 A | | 11/1998 | Furukawa et al. |
| 5,834,614 A | | 11/1998 | Furukawa et al. |
| 5,976,702 A | | 11/1999 | Yoneda et al. |
| 6,129,980 A | * | 10/2000 | Tsukada et al. ............. 428/327 |
| 6,197,989 B1 | | 3/2001 | Furukawa et al. |

FOREIGN PATENT DOCUMENTS

| EP | 0 513 690 | 11/1992 |
|---|---|---|
| EP | 0 703 282 | 3/1996 |
| EP | 0 823 406 | 2/1998 |
| WO | WO 99/37720 | 7/1999 |

OTHER PUBLICATIONS

Patent Abstracts of Japan, JP 05–331455, Dec. 14, 1993.

* cited by examiner

*Primary Examiner*—Brian Davis
(74) *Attorney, Agent, or Firm*—Oblon, Spivak, McClelland, Maier & Neustadt, P.C.

(57) ABSTRACT

A water repellent composition comprising a compound of the following formula 1, and a compound of the following formula 4 and/or a compound of the following formula 5:

$$R^f Si(R)_p(X)_{3-p} \quad \text{Formula 1}$$

$$R^F Si(R^1)_q(X^1)_{3-q} \quad \text{Formula 4}$$

$$SiX^2_4 \quad \text{Formula 5}$$

wherein $R^f$ is a fluorine-containing organic group having an etheric oxygen atom, $R^F$ is a fluorine-containing organic group having no etheric oxygen atom, each of R and $R^1$ which are independent of each other, is a $C_{1-6}$ hydrocarbon group containing no fluorine atom, each of X, $X^1$ and $X^2$ which are independent of one another, is a halogen atom or a hydrolyzable group, and each of p and q which are independent of each other, is 0, 1 or 2.

16 Claims, No Drawings

WATER REPELLENT COMPOSITION, SURFACE-TREATED SUBSTRATE, PROCESS FOR ITS PRODUCTION AND ARTICLE FOR TRANSPORT EQUIPMENT

The present invention relates to a water repellent composition capable of forming a surface treatment layer on which water droplets are less likely to deposit or from which deposited water droplets can easily be removed, a surface-treated substrate having a surface treatment layer formed of such a water repellent composition, a process for producing such a substrate, and an article for transportation equipment, which comprises such a substrate.

It is desirable to impart to a substrate surface a property whereby water droplets are less likely to become deposited upon said substrate surface and wherein deposited water droplets can easily be removed (such a property will hereinafter be referred to as a water droplet removal property). In order to impart the water droplet removal property to a substrate surface, a hydrophilic oil repellent treating agent comprising a fluorine-containing silane compound and a hydrophilic silane compound, has, for example, been proposed (JP-A-5-331455). However, this surface treating agent is hydrophilic, and thus can not be applied to an article for a transport equipment which is desired to have water repellency.

It is an object of the present invention to provide a water repellent composition capable of forming a surface treatment layer which has an excellent water droplet removal property and is also excellent in its durability (abrasion resistance, chemical resistance, weather resistance, etc.). Further, another object is to provide a surface-treated substrate having a surface treatment layer formed of such a water repellent composition, a process for producing such a substrate, and an article for a transportation equipment.

The present invention provides a water repellent composition (hereinafter referred to as the water repellent composition (I)) comprising a compound of the following formula 1 (hereinafter referred to as the compound 1, and other compounds will also be likely referred to), and a compound of the following formula 4 and/or a compound of the following formula 5:

  Formula 1

  Formula 4

  Formula 5 wherein $R^f$ is a fluorine-containing organic group having an etheric oxygen atom, $R^F$ is a fluorine-containing organic group having no etheric oxygen atom, each of R and $R^1$ which are independent of each other, is a $C_{1-6}$ hydrocarbon group containing no fluorine atom, each of X, $X^1$ and $X^2$ which are independent of one another, is a halogen atom or a hydrolyzable group, and each of p and q which are independent of each other, is 0, 1 or 2.

Compound 1 is a compound having a fluorine-containing organic group having an etheric oxygen atom (the fluorine-containing organic group having an etheric oxygen atom will hereinafter be referred to as a $R^f$ group) at one molecular terminal, and having a reactive group at the other molecular terminal. The $R^f$ group contributes to improvement of the mobility or a sliding nature of water droplets on the surface treatment layer formed of the water repellent composition (I). The detailed mechanism of such improvement is not known, but it is considered that since the $R^f$ group contains fluorine atoms, the surface energy of the surface treatment layer formed of the water repellent composition (I) can be made small, and due to its high molecular chain mobility attributable to the structure connected by the etheric oxygen atom, the surface treatment layer is able to efficiently align fluorine atoms. Namely, the high molecular chain mobility makes change in alignment of fluorine atoms in correspondence with the movement of water droplets on the surface of the surface treatment layer possible, whereby the sliding nature of water droplets will be increased.

The fluorine-containing organic group having no etheric oxygen atom in the surface treating agent heretofore proposed, likewise contains fluorine atoms, whereby the surface energy of the treatment layer formed of such a surface treating agent can be made small. However, the fluorine-containing organic group having no etheric oxygen atom has a very rigid structure, whereby fluorine atoms present on the surface can hardly undergo change in alignment and can not follow the movement of water droplets. Accordingly, it is considered that water droplets may slide efficiently in certain regions but tend to hardly slide in other regions, and thus, water droplets will be anchored somewhere, and the sliding nature of water droplets tends to be low.

In the water repellent composition (I), the compound 1 may be composed of one type or two or more types.

The structure of the $R^f$ group in the compound 1 is not particularly limited. In the compound 1, $R^f$ is preferably a group represented by $F(CF_2)_aO[CF(Y)CF_2O]_n$—A—, wherein A is a $C_{2-32}$ bivalent organic group (provided that a bivalent organic group consisting solely of $CF(Y)CF_2O$ is excluded), a is an integer of from 2 to 8, Y is a fluorine atom or $CF_3$, and n is an integer of from 0 to 50.

Namely, as the compound 1, a compound of the following formula 2 is preferred from the viewpoint of the water droplet removal property or its durability. In the following formula, a, n, A, R, p and X are as defined above.

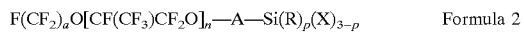  Formula 2

In the formula 1 or 2, R is preferably a methyl group or an ethyl group, from the viewpoint of the durability. The hydrolyzable group for X is preferably an alkoxy group, an acyloxy group, a ketoxime group, an alkenyloxy group, an amino group, an aminoxy group, an amide group or an isocyanate group. X is preferably at least one member selected from the group consisting of a halogen atom (especially a chlorine atom), an alkoxy group and an isocyanate group. The larger the number of X i.e. (3–p), the better, since the adhesion will be excellent, and p is particularly preferably 0 or 1. n is preferably from 0 to 20, since the denseness of the surface treatment layer can thereby be made high. a is preferably 2, 3 or 4, particularly preferably 3.

A is preferably a group represented by $A^1$—$R^2$, wherein $A^1$ is a $C_{1-16}$ polyfluoroalkylene group, and $R^2$ is a $C_{1-16}$ bivalent organic group, from the viewpoint of the water droplet removal property or its durability. $A^1$ may be of a straight chain structure or a branched structure. $A^1$ is preferably a perfluoroalkylene group, particularly preferably —$CF(CF_3)(CF_2)_z$—, wherein z is an integer of at least 0, preferably 0, 1, 2, 3 or 4, or —$(CF_2)_y$—, wherein y is an integer of at least 1, preferably 2, 3 or 4.

$R^2$ is preferably a $C_{1-16}$ bivalent hydrocarbon group containing no fluorine atom. However, it may contain an etheric oxygen atom in its molecule. $R^2$ may be of a straight chain structure or a branched structure, but preferably of a straight chain structure. $R^2$ is preferably —$(CH_2)_s$—, wherein s is an integer of from 2 to 16, preferably 2, 3 or 4, —(CH$_2$)$_t$—O—(CH$_2$)$_u$—, wherein t is an integer of from 2 to 10, preferably 2, 3 or 4, and u is an integer of from 2 to 14, preferably 2, 3 or 4, provided that t+u is from 2 to 16.

Specific examples of the compound 1 will be shown below.

| | |
|---|---|
| F[CF(CF$_3$)CF$_2$O]$_2$(CF$_2$)$_2$(CH$_2$)$_2$SiCl$_3$ | Compound 1A |
| F[CF(CF$_3$)CF$_2$O](CF$_2$)$_2$(CH$_2$)$_2$O(CH$_2$)$_3$SiCl$_3$ | Compound 1B |
| F[CF(CF$_3$)CF$_2$O]$_6$(CF$_2$)$_2$(CH$_2$)$_2$SiCl$_3$ | Compound 1C |
| F[CF(CF$_3$)CF$_2$O]$_6$(CF$_2$)$_2$(CH$_2$)$_2$Si(OCH$_3$)$_3$ | Compound 1D |
| F[CF(CF$_3$)CF$_2$O]$_2$(CF$_2$)$_2$(CH$_2$)$_2$Si(NCO)$_3$ | Compound 1E |

The compound 1 may be used as it is or in the form of a hydrolyzed product. The hydrolyzed product of the compound 1 is meant for a compound obtained by hydrolyzing all or some of reactive groups of the compound 1 in water or in an acidic or alkaline aqueous solution. As the acidic aqueous solution, an aqueous solution of e.g. hydrochloric acid, acetic acid, sulfuric acid, phosphoric acid, sulfonic acid, methansulfonic acid or p-toluene sulfonic acid, may be employed. As the alkaline aqueous solution, an aqueous solution of e.g. sodium hydroxide, potassium hydroxide or ammonia, may be used.

In order to increase the water droplet removal property and its durability of the surface treatment layer formed of the water repellent composition (I), the water repellent (I) contains the following compound 4 and/or the following compound 5.

$R^F Si(R^1)_q(X^1)_{3-q}$  Formula 4

$SiX^2_4$  Formula 5 wherein $R^F$ is a fluorine-containing organic group having no etheric oxygen atom, $R^1$ is a $C_{1-6}$ hydrocarbon group containing no fluorine atom, each of $X^1$ and $X^2$ which are independent of each other, is a halogen atom or a hydrolyzable group, and q is 0, 1 or 2.

$R^F$ in the compound 4 is preferably such that a carbon atom having no fluorine atom (such as a methylene group, an ethylene group or a propylene group) is bonded to the adjacent silicon atom. $R^F$ is preferably a polyfluoroalkyl group, particularly preferably such that the terminal portion bonded to the adjacent silicon atom is an alkylene group (particularly an ethylene group), and the other portion is a perfluoroalkyl group. The carbon number of the perfluoroalkyl group is preferably from 3 to 16.

$R^1$ is preferably an alkyl group having a small carbon number, particularly preferably a methyl group or an ethyl group. $X^1$ or $X^2$ is preferably the same group as the above X, particularly preferably a chlorine atom, an alkoxy group or an isocyanate group. From the viewpoint of the adhesiveness or the excellent durability of the formed layer, q is preferably 0 or 1. The compound 4 may be composed of one type only or two or more types in combination.

Specific examples of the compound 4 will be shown below. In the following formulae, $X^1$ and $R^1$ are as defined above, and the preferred embodiments are the same as mentioned above, e is an integer of from 1 to 17, and m is 2, 3 or 4.

F(CF$_2$)$_e$(CH$_2$)$_m$SiX$^1_3$,
F(CF$_2$)$_e$(CH$_2$)$_m$Si(R$^1$)X$^1_2$,
F(CF$_2$)$_e$CONH(CH$_2$)$_m$SiX$^1_3$,
F(CF$_2$)$_e$CONH(CH$_2$)$_m$Si(R$^1$)X$^1_2$,
F(CF$_2$)$_e$CONH(CH$_2$)$_m$NH(CH$_2$)$_m$SiX$^1_3$,
F(CF$_2$)$_e$CONH(CH$_2$)$_m$NH(CH$_2$)$_m$Si(R$^1$)X$^1_2$.

The compound 5 is a compound wherein reactive groups are bonded directly to the silicone atom. The adhesiveness or denseness is increased by the effects of the reactive groups, which in tern contributes to improvement of the durability. The compound 5 is preferably tetrachlorosilane, tetraisocyanatesilane, tetraalkoxysilane or hydrolyzates thereof. The compound 5 may be used in combination of two or more types.

The proportion of the compound 1 in the water repellent composition (I) is preferably from 0.5/10 to 6/10 as represented by (the compound 1)/(the compound 1+the compound 4+the compound 5).

The water repellent composition (I) may be composed solely of the above described essential components, but in view of the economical efficiency, workability, controllability of the thickness of the surface treatment layer, etc., it may contain an organic solvent. The organic solvent is not particularly limited, so long as it dissolves the essential components. The organic solvent is preferably an alcohol, a ketone, an aromatic hydrocarbon, a paraffin type hydrocarbon, an acetic acid ester, etc., particularly preferably a paraffin type hydrocarbon or an acetic acid ester. The organic solvent is not limited to one type, but two or more solvents different in the polarity, evaporation rate, etc., may be used in combination.

The proportion of the organic solvent in the water repellent composition (I) is preferably at most 100,000 parts by mass, more preferably at most 10,000 parts by mass per 100 parts by mass of the total amount of the compound 1, the compound 4 and/or the compound 5. If it exceeds 100,000 parts by mass, treatment irregularities are likely to result.

The water repellent composition (I) can be coated by a known method. For example, it is possible to employ a method such as brush coating, cast coating, spin coating, dip coating, squeegee coating, spray coating or manual coating. And, by drying in the atmospheric air or in a nitrogen atmosphere, a surface treatment layer can be formed. Depending upon the treating method, an excess component may form to impair the quality of appearance, but such an excess component may be removed by wiping with or without a solvent to adjust the appearance.

The thickness of the surface treatment layer formed of the water repellent composition (I) is not particularly limited. However, taking economical efficiency into consideration, a thickness of at most 50 nm is preferred, and the lower limit is the thickness of a monomolecular layer.

To the water repellent composition (I), a functional additive may be incorporated as the case requires. The functional additive is preferably selected taking into consideration the reactivity or compatibility with the essential components, and it may preferably be, for example, a non-fluorine type water repellent material such as a one-terminal reactive polydimethylsiloxane or a both-terminal reactive polydimethylsiloxane, ultrafine particles of a metal oxide such as silica, alumina, zirconia or titania, a colorant material such as a dye or a pigment, an anti-fouling material, a catalyst or various resins. The amount of functional additives to be added, is preferably from 0.01 to 20 parts by mass, per 100 parts by mass of the total amount of the compound 1, the compound 4 and/or the compound 5. An excessive addition is likely to deteriorate the water droplet removal property, etc.

The surface-treated substrate of the present invention has at least one surface treatment layer, and it is preferred that the outermost layer of the surface treatment layer is a layer formed of the water repellent composition (I). Further, it is preferred that in order to improve the water droplet removal property or its durability of the surface treatment layer, a layer formed of a water repellent composition (II) containing the compound 4 or of the water repellent composition (III) containing the compound 5, is formed as a second layer in contact with the inner side of the first layer being the outermost layer. It is also preferred that a layer formed of the water repellent composition (II) containing the compound 4 is formed as a second layer in contact with the inner side of the first layer being the outermost layer, and a layer formed of the water repellent composition (III) containing the compound 5 is formed as a third layer in contact with the inner side of the second layer.

The compound 4 in the water repellent composition (II) is preferably the same compound as the compound 4 as described with respect to the water repellent composition (I). The compound 4 is preferably a compound capable of forming a surface, whereby the value of the contact angle to water of the surface of the layer formed of the water repellent composition (II), is at least 100°.

The compound 5 in the water repellent composition (III) is preferably the same compound as the compound 5 as described with respect to the water repellent composition (I).

The concept of the surface treatment layer in the present invention is such that the boundary lines are not strictly defined, and a part or whole of the boundaries may be microscopically mutually intermingled between the adjacent layers. The presence of a layer formed of the water repellent composition (II) or a layer formed of the water repellent composition (III) in the surface treatment layer, is effective for the improvement of the durability of the water droplet removal property. Such a mechanism is not clearly understood, but it is considered that the layer formed of the water repellent composition (II) has an effect to prevent penetration of various deteriorating factors attributable to water into the layer, by its high water repellency, and the layer formed of the water repellent composition (III) has an effect to improve the adhesion of the substrate with the layer formed of the water repellent composition (I) or with the layer formed of the water repellent composition (II), by its excellent reactivity.

The water repellent composition (II) or the water repellent composition (III) may be composed solely of the essential component such as the compound 4 or the compound 5, but it may contain an organic solvent in consideration of the economical efficiency, workability, efficient controllability of the thickness of the treated layer, etc. As such an organic solvent, the organic solvent disclosed with respect to the water repellent composition (I) may preferably be used.

The water repellent composition (II) or the water repellent composition (III) may contain a functional additive, as the case requires. The functional additive may preferably the one described with respect to the water repellent composition (I). Further, with respect to coating of the water repellent composition (II) or the water repellent composition (III), the method described with respect to the water repellent composition (I), may preferably be mentioned.

The thickness of the layer formed of the water repellent composition (II) or the water repellent composition (III) is not particularly limited. However, if the layer is too thick, a damage may distinctly be observed. Accordingly, it is preferably at most 50 nm. The lower limit is the thickness of a monomolecular layer. The thickness of the layer may suitably be controlled by e.g. the concentration of each water repellent composition, the coating conditions or heating conditions. The overall thickness of the surface treatment layer is preferably at most 100 nm taking also the economical efficiency into consideration.

The process for producing the surface-treated substrate is preferably a process comprising a step of forming a surface treatment layer on the surface of a substrate, wherein at least the outermost layer of the surface treatment layer is a layer formed of the water repellent composition (I). The process for producing a surface-treated substrate having a surface treatment layer of at least two layers, is preferably a process comprising a step of forming a second layer on the surface of a substrate by means of the water repellent composition (II) containing the compound 4 or the water repellent composition (III) containing the compound 5, and a step of forming the first layer by means of the water repellent composition (I).

Further, the process for producing a surface-treated substrate having a surface treatment layer of at least three layers, is preferably a process comprising a step of forming a third layer by means of the water repellent composition (III) containing the compound 5, a step of forming a second layer by means of the water repellent composition (II) containing the compound 4, and a step of forming the first layer by means of the water repellent composition (I).

The surface treatment layer is formed on the substrate surface, but the substrate surface may have various films formed by e.g. vapor deposition, sputtering or wet method. When the substrate is soda lime glass, it is preferred to provide a film to prevent elution of Na ions, from the viewpoint of durability. The layer formed of the water repellent composition (III) also has a function to prevent elution of Na ions.

When the water repellent compositions (I) to (III) are coated on the substrate surface, no special pretreatment is required. However, depending upon the purpose, acid treatment (treatment by means of diluted hydrofluoric acid, sulfuric acid, hydrochloric acid or the like), alkali treatment (treatment by means of e.g. an aqueous sodium hydroxide solution) or discharge treatment (such as plasma irradiation, corona irradiation or electron beam irradiation) may be carried out. To form the surface treatment layer by using the water repellent composition (I), the water repellent composition (II) or the water repellent composition (III), no heat treatment is required, and the coated substrate may be left to stand at room temperature.

In the present invention, the substrate is not particularly limited, and a metal, plastic, glass, ceramics or a combination thereof (a composite material, a laminated material, etc.) is preferably employed. Particularly preferred is a transparent substrate of e.g. glass or plastic. The shape of the substrate is not limited to a flat plate, and the entire surface or a part may have a curvature.

The surface-treated substrate of the present invention is preferably used as an article for a transport equipment. The article for an transport equipment may, for example, be a body of e.g. an electric train, an automobile, a ship or an aircraft, window glass (front glass, side glass or rear glass), a mirror or a bumper.

With the surface-treated substrate or the article for a transport equipment of the present invention, the surface has an excellent water droplet removal property, whereby deposition of water droplets on the surface is scarce, and deposited water droplets will be quickly repelled. In addition, by the interaction with wind pressure resulting from the movement of the transport equipment, deposited water droplets swiftly move on the surface and will not stay as water droplets. Thus, adverse effects caused by water can be eliminated.

Especially in the application transparent portions of various window glasses or the like, it becomes very easy to secure a visual field by easy removal of water droplets, whereby the safety can be improved in the operation of vehicles. Further, even in a freezing environment, water droplets tend to be hardly frozen, and even if frozen, thawing is very fast. Further, deposition of water droplets is scarce, whereby the number of cleaning operations can be reduced, and yet, cleaning operations can easily be carried out.

Now, the present invention will be described with reference to Examples. However, the present invention is by no means restricted to such specific Examples. In each Example, the measurements of various physical properties were carried out by the following methods, and the results are shown in Table 1 (unit: degrees).

Sample substrate: cleaned glass plate (10 cm×10 cm×3 mm in thickness).

1. Water Droplet Removal Property 1-1. Contact Angle

The contact angle of a droplet having a diameter of 1 mm, placed on the surface of the sample, was measured. Measurements were carried out at five different positions on the surface, and the average value was shown.

1-2. Sliding Angle

A water droplet of 50 μl was dropped on the surface of the sample maintained horizontally, and then, the sample was gradually inclined, whereby the angle (the sliding angle) between the horizontal plane and the sample when the water droplet started sliding, was measured. The smaller the sliding angle, the better the water droplet removal property.

2. Abrasion Resistance

The sample was subjected to an abrasion test under the following test conditions, whereupon the contact angle and the sliding angle were measured.

Testing machine: A reciprocal traverse testing machine, manufactured by KNT Company.

Test conditions: Flannel cloth, load: 1 kg, number of times of abrasion: 3,000 reciprocations.

3. Weather Resistant Test

A weather resistant test was carried out by repeating 200 cycles, each cycle consisting of a process of irradiating ultraviolet rays for 8 hours (70° C.) and then carrying out wet exposure for 4 hours (50° C.), whereupon the contact angle and the sliding angle were measured.

Compounds Used

Compound 4A: $F(CF_2)_8(CH_2)_2SiCl_3$
Compound 5A: $Si(NCO)_4$
Compound 4B: $F(CF_2)_8(CH_2)_2Si(NCO)_3$
Compound 5B: $Si(OC_2H_5)_4$
Compound 4C: $F(CF_2)_8(CH_2)_2Si(OCH_3)_3$ With respect to compound 1A, 1B, 1C, 1D and 1E, those mentioned above, were used.

Preparation of Treating Agents 1 to 15

The following starting materials were put into a glass container equipped with a stirrer and a thermometer and stirred at 25° C. for 10 minutes to obtain treating agents 1 to 15.

Treating agent 1: 0.6 g of compound 1A, 2.4 g of compound 4A, and 97.0 g of butyl acetate.

Treating agent 2: 1.5 g of compound 1A, 1.5 g of compound 4A, and 97.0 g of butyl acetate.

Treating agent 3: 2.4 g of compound 1A, 0.6 g of compound 4A, and 97.0 g of butyl acetate.

Treating agent 4: 0.6 g of compound 1B, 2.4 g of compound 4A, and 97.0 g of butyl acetate.

Treating agent 5: 0.6 g of compound 1C, 2.4 g of compound 4A, and 97.0 g of butyl acetate.

Treating agent 6: 0.6 g of compound 1A, 2.4 g of compound 4B, and 97.0 g of butyl acetate.

Treating agent 7: 0.6 g of compound 1E, 0.6 g of compound 4B, and 97.0 g of butyl acetate.

Treating agent 8: 2.4 g of compound 4C, 0.6 g of compound 1D, and 97.0 g of isopropyl alcohol. Further, 3.2 g of an aqueous nitric acid solution (0.1 mol/l) was dropwise added to the obtained treating agent, followed by stirring at 25° C. for three days.

Treating agent 9: 2.4 g of compound 1A, 0.6 g of compound 5A, and 97.0 g of butyl acetate.

Treating agent 10: 0.5 g of compound 1A, 0.2 g of compound 5A, 2.3 g of compound 4A, and 97.0 g of butyl acetate.

Treating agent 11: 2.0 g of compound 5A, and 98.0 g of butyl acetate.

Treating agent 12: 3.0 g of compound 5B, and 97.0 g of isopropyl alcohol. Further, 3.0 g of an aqueous nitric acid solution (0.1 mol/l) was dropwise added to the obtained treating agent, followed by stirring at 25° C. for one day.

Treating agent 13: 3.0 g of compound 5B, and 97.0 g of isopropyl alcohol (treating agent 13A). 10.0 g of p-toluene sulfonic acid, and 90.0 g of isopropyl alcohol (treating agent 13B). 50 g of treating agent 13A and 1 g of treating agent 13B were stirred and mixed immediately before the treatment.

Treating agent 14: 3.0 g of compound 1A, and 97.0 g of butyl acetate.

Treating agent 15: 3.0 g of compound 4A, and 97.0 g of butyl acetate.

EXAMPLE 1

0.5 ml of treating agent 1 was dropped on the sample substrate and spreaded in the same manner as waxing a car. This substrate was stored at room temperature for one day to obtain sample 1.

EXAMPLE 2

Sample 2 was obtained in the same manner as in Example 1 except that treating agent 2 was used instead of treating agent 1 in Example 1.

EXAMPLE 3

Sample 3 was obtained in the same manner as in Example 1 except that treating agent 3 was used instead of treating agent 1 in Example 1.

EXAMPLE 4

Sample 4 was obtained in the same manner as in Example 1 except that treating agent 4 was used instead of treating agent 1 in Example 1.

EXAMPLE 5

Sample 5 was obtained in the same manner as in Example 1 except that treating agent 5 was used instead of treating agent 1 in Example 1.

EXAMPLE 6

Sample 6 was obtained in the same manner as in Example 1 except that treating agent 6 was used instead of treating agent 1 in Example 1.

EXAMPLE 7

Sample 7 was obtained in the same manner as in Example 1 except that treating agent 7 was used instead of treating agent 1 in Example 1.

EXAMPLE 8

Sample 8 was obtained in the same manner as in Example 1 except that treating agent 8 was used instead of treating agent 1 in Example 1.

EXAMPLE 9

Sample 9 was obtained in the same manner as in Example 1 except that treating agent 9 was used instead of treating agent 1 in Example 1.

EXAMPLE 10

Sample 10 was obtained in the same manner as in Example 1 except that treating agent 10 was used instead of treating agent 1 in Example 1.

EXAMPLE 11

0.5 ml of treating agent 11 was dropped on the sample substrate and spreaded in the same manner as waxing a car. The substrate was left to stand at room temperature for one minute, and then, 0.5 ml of treating agent 1 was dropped and spreaded in the same manner as waxing a car. This substrate was stored at room temperature for one day to obtain sample 11.

EXAMPLE 12

Sample 12 was obtained in the same manner as in Example 11 except that treating agent 12 was used instead of treating agent 11 in Example 11.

EXAMPLE 13

Sample 13 was obtained in the same manner as in Example 11 except that treating agent 13 was used instead of treating agent 11 in Example 11.

EXAMPLE 14

Sample 14 was obtained in the same manner as in Example 11 except that treating agent 15 was used instead of treating agent 11 in Example 11.

EXAMPLE 15

0.5 ml of treating agent 11 was dropped on the sample substrate and spreaded in the same manner as waxing a car. The substrate was left to stand at room temperature for one minute, and then, 0.5 ml of treating agent 15 was dropped and spreaded in the same manner as waxing a car. The substrate was left to stand at room temperature for one minute, and then, 0.5 ml of treating agent 1 was further dropped and spreaded in the same manner as waxing a car. This substrate was stored at room temperature for one day to obtain sample 15.

EXAMPLE 16

Sample 8 in Example 8 was heated at 200° C. for 60 minutes to obtain sample 16.

EXAMPLE 17

0.5 ml of treating agent 11 was dropped on the sample substrate and spreaded in the same manner as waxing a car. This substrate was heated at 650° C. for 7 minutes and cooled to room temperature. Then, 0.5 ml of treating agent 1 was dropped and spreaded in the same manner as waxing a car. This substrate was stored at room temperature for one day to obtain sample 17.

EXAMPLE 18

0.5 ml of treating agent 12 was dropped on the sample substrate and spreaded in the same manner as waxing a car. This substrate was heated at 200° C. for 10 minutes and cooled to room temperature. Then, 0.5 ml of treating agent 1 was dropped and spreaded in the same manner as waxing a car. This substrate was stored at room temperature for one day to obtain sample 18.

EXAMPLE 19

Sample 19 was obtained in the same manner as in Example 1 except that treating agent 14 was used instead of treating agent 1 in Example 1.

EXAMPLE 20

Sample 20 was obtained in the same manner as in Example 1 except that treating agent 15 was used instead of treating agent 1 in Example 1.

TABLE 1

| Ex. No. | Initial | | After abrasion resistance test | | After weather resistance test | |
|---|---|---|---|---|---|---|
| | Contact angle | Sliding angle | Contact angle | Sliding angle | Contact angle | Sliding angle |
| 1 | 113 | 8 | 105 | 11 | 93 | 16 |
| 2 | 112 | 8 | 104 | 13 | 92 | 17 |
| 3 | 111 | 8 | 95 | 20 | 85 | 25 |
| 4 | 112 | 10 | 103 | 13 | 92 | 17 |
| 5 | 112 | 10 | 103 | 12 | 92 | 16 |
| 6 | 113 | 10 | 105 | 13 | 92 | 18 |
| 7 | 112 | 10 | 104 | 13 | 92 | 17 |
| 8 | 112 | 8 | 104 | 11 | 93 | 15 |
| 9 | 112 | 7 | 102 | 15 | 90 | 20 |
| 10 | 113 | 7 | 105 | 10 | 95 | 14 |
| 11 | 112 | 8 | 108 | 12 | 102 | 12 |
| 12 | 113 | 8 | 110 | 11 | 102 | 12 |
| 13 | 113 | 8 | 112 | 10 | 102 | 10 |
| 14 | 113 | 9 | 110 | 13 | 103 | 15 |
| 15 | 113 | 8 | 111 | 9 | 108 | 16 |
| 16 | 112 | 8 | 106 | 9 | 106 | 11 |
| 17 | 111 | 8 | 110 | 10 | 106 | 11 |
| 18 | 111 | 8 | 110 | 10 | 106 | 11 |
| 19 | 112 | 8 | 102 | 9 | 78 | 19 |
| 20 | 110 | 24 | 105 | 28 | 92 | 42 |

EXAMPLE 21

Sample 1 was immersed in a reagent shown in Table 2 for 24 hours, then taken out and immediately cleaned, whereupon the appearance was observed, and the contact angle and the sliding angle were measured. The results are shown in Table 2. With respect to sample 15, the same operation was carried out, and the results are shown in Table 3.

TABLE 2

| Type of reagent | Appearance | Contact angle | Sliding angle |
|---|---|---|---|
| Methanol | No change | 109 | 13 |
| Acetone | No change | 109 | 12 |
| Gasoline | No change | 109 | 12 |
| 1% Sulfuric acid aqueous solution | No change | 109 | 13 |
| 1% NaOH aqueous solution | No change | 106 | 15 |

TABLE 3

| Type of reagent | Appearance | Contact angle | Sliding angle |
| --- | --- | --- | --- |
| Methanol | No change | 111 | 11 |
| Acetone | No change | 111 | 11 |
| Gasoline | No change | 111 | 11 |
| 1% Sulfuric acid aqueous solution | No change | 111 | 11 |
| 1% NaOH aqueous solution | No change | 110 | 12 |

EXAMPLE 22

On the surface of a front laminated glass for an automobile, a surface treatment layer was formed by using the method of Example 1, and the glass was mounted at the front of an automobile. By using this automobile, a running test for two hours in day time was carried out for three months, whereby the state of deposition of dust and stain on the surface, and the state of deposition of water droplets during raining, were visually observed.

As a result, no substantial deposition of dust or stain, or no substantial deposition of water droplets, was observed, and accordingly, no substantial formation of fur was observed. Even if formation of fur was observed, it was easily removed by wiping gently with a tissue paper. Further, in running during raining, water drops on the surface were repelled, and water drops swiftly moved by the interaction with the wind pressure by running, whereby the visual field was secured without using a wiper.

EXAMPLE 23

A running test was carried out by changing the front laminated glass in Example 22 to a side glass or a rear glass, whereby the same effects as in Example 22 were confirmed.

EXAMPLE 24

A front laminated glass for an automobile, which was continuously used for five years, was polished with calcium carbonate, then washed with water and dried for one hour. On this glass, a surface treatment layer was formed by using the method of Example 1. Using this automobile, a running test was carried out in the same manner as in Example 22, whereby the same effects as in Example 22 were confirmed.

The following excellent effects are observed with the surface treated substrate or the article for a transport equipment of the present invention.

It is excellent in the water droplet removal property and free from deposition of dust, stain or water droplets, whereby no formation of fur is observed. Even if formation of fur is observed, it can easily be removed. Further, adverse effects caused by water can be prevented, and cleaning of the surface can easily be carried out. It is excellent in durability of the water droplet removal property, and the water droplet removal property can be maintained semipermanently. A surface treatment layer can be formed at room temperature without requiring any special pretreatment, such being economical. The surface-treated substrate of the present invention is most suitable for an article for a transport equipment.

The entire disclosure of Japanese Patent Application No. 2001-25910 filed on Feb. 1, 2001 including specification, claims and summary are incorporated herein by reference in its entirety.

What is claimed is:

1. A water repellent composition comprising a compound of the following formula 1, and a compound of the following formula 4 and/or a compound of the following formula 5:

$$R^f Si(R)_p(X)_{3-p} \quad \text{Formula 1}$$

$$R^F Si(R^1)_q(X^1)_{3-q} \quad \text{Formula 4}$$

$$SiX^2{}_4 \quad \text{Formula 5}$$

wherein $R^f$ is a fluorine-containing organic group having an etheric oxygen atom, $R^F$ is a fluorine-containing organic group having no etheric oxygen atom, each of R and $R^1$ which are independent of each other, is a $C_{1-6}$ hydrocarbon group containing no fluorine atom, each of X, $X^1$ and $X^2$ which are independent of one another, is a halogen atom or a hydrolyzable group, and each of p and q which are independent of each other, is 0, 1 or 2.

2. The water repellent composition according to claim 1, wherein $R^f$ in the formula 1 is $F(CF_2)_a O[CF(Y)CF_2 O]_n$—A—, wherein A is a $C_{2-32}$ bivalent organic group (provided that a bivalent organic group consisting solely of CF(Y)$CF_2O$ is excluded), a is an integer of from 2 to 8, Y is a fluorine atom or $CF_3$, and n is an integer of from 0 to 50.

3. The water repellent composition according to claim 1, wherein X in the formula 1 is at least one hydrolyzable group selected from the group consisting of a halogen atom, an alkoxy group and an isocyanate group.

4. The water repellent composition according to claim 1, wherein the proportion of the compound of the formula 1 in the water repellent composition is from 0.5/10 to 6/10 as represented by (the compound of the formula 1)/(the compound of the formula 1+the compound of the formula 4+the compound of the formula 5).

5. A surface-treated substrate having a surface treatment layer formed of the water repellent composition as defined in claim 1.

6. A process for producing a surface-treated substrate, which comprises a step of forming a surface treatment layer on the surface of a substrate, wherein at least the outermost layer of the surface treatment layer is a layer formed of the water repellent composition as defined in claim 1.

7. The water repellent composition according to claim 2, wherein X in the formula 1 is at least one hydrolyzable group selected from the group consisting of a halogen atom, an alkoxy group and an isocyanate group.

8. The water repellent composition according to claim 2, wherein the proportion of the compound of the formula 1 in the water repellent composition is from 0.5/10 to 6/10 as represented by (the compound of the formula 1)/(the compound of the formula 1+the compound of the formula 4+the compound of the formula 5).

9. A surface-treated substrate having a surface treatment layer formed of the water repellent composition as defined in claim 2.

10. A process for producing a surface-treated substrate, which comprises a step of forming a surface treatment layer on the surface of a substrate, wherein at least the outermost layer of the surface treatment layer is a layer formed of the water repellent composition as defined in claim 2.

11. The water repellent composition according to claim 3, wherein the proportion of the compound of the formula 1 in the water repellent composition is from 0.5/10 to 6/10 as represented by (the compound of the formula 1)/(the compound of the formula 1+the compound of the formula 4+the compound of the formula 5).

12. A surface-treated substrate having a surface treatment layer formed of the water repellent composition as defined in claim 3.

13. A process for producing a surface-treated substrate, which comprises a step of forming a surface treatment layer on the surface of a substrate, wherein at least the outermost layer of the surface treatment layer is a layer formed of the water repellent composition as defined in claim 3.

14. A surface-treated substrate having a surface treatment layer formed of the water repellent composition as defined in claim 4.

15. A process for producing a surface-treated substrate, which comprises a step of forming a surface treatment layer on the surface of a substrate, wherein at least the outermost layer of the surface treatment layer is a layer formed of the water repellent composition as defined in claim 4.

16. An article for a transport equipment, which comprises the surface-treated substrate as defined in claim 5.

* * * * *